(12) United States Patent
Lin

(10) Patent No.: US 12,284,672 B2
(45) Date of Patent: Apr. 22, 2025

(54) METHOD OF LBT TYPE DETERMINATION AND USER EQUIPMENT

(71) Applicant: GUANGDONG OPPO MOBILE TELECOMMUNICATIONS CORP., LTD., Guangdong (CN)

(72) Inventor: Hao Lin, Neuilly-sur-Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 472 days.

(21) Appl. No.: 17/693,945

(22) Filed: Mar. 14, 2022

(65) Prior Publication Data

US 2022/0210831 A1    Jun. 30, 2022

Related U.S. Application Data

(63) Continuation of application No. PCT/CN2020/120455, filed on Oct. 12, 2020.

(30) Foreign Application Priority Data

Oct. 11, 2019    (WO) .................. PCT/IB2019/001186

(51) Int. Cl.
*H04W 74/0808* (2024.01)
*H04W 72/23* (2023.01)

(52) U.S. Cl.
CPC ....... *H04W 74/0808* (2013.01); *H04W 72/23* (2023.01)

(58) Field of Classification Search
CPC ............ H04W 72/23; H04W 74/0808; H04W 74/0816

See application file for complete search history.

(56) References Cited

U.S. PATENT DOCUMENTS

| | | | |
|---|---|---|---|
| 2018/0027582 A1* | 1/2018 | Yerramalli | H04W 56/0005 370/336 |
| 2018/0270860 A1* | 9/2018 | Bhorkar | H04W 74/006 |
| 2019/0200379 A1* | 6/2019 | Wang | H04W 72/1268 |
| 2019/0313451 A1 | 10/2019 | Liu et al. | |
| 2019/0349815 A1* | 11/2019 | Tiirola | H04W 72/12 |
| 2021/0320761 A1* | 10/2021 | Yang | H04W 72/1273 |
| 2021/0392684 A1* | 12/2021 | Tiirola | H04W 74/0808 |
| 2022/0014314 A1* | 1/2022 | Wang | H04L 5/0055 |
| 2022/0330340 A1* | 10/2022 | Lei | H04W 74/0808 |

FOREIGN PATENT DOCUMENTS

| | | |
|---|---|---|
| CN | 107466110 A | 12/2017 |
| CN | 114287162 A | 4/2022 |
| WO | 2017213393 A1 | 12/2017 |

OTHER PUBLICATIONS

Examination Report for European Application No. 20874454.0 issued Feb. 28, 2023. 8 pages.
International Search Report Mailed Dec. 31, 2020 in Application No. PCT/CN2020/120455.

(Continued)

*Primary Examiner* — Jeong S Park
(74) *Attorney, Agent, or Firm* — PERKINS COIE LLP

(57) ABSTRACT

A method, a User Equipment, a computer program and a computer readable medium for LBT determination are provided.

13 Claims, 2 Drawing Sheets

(56) References Cited

OTHER PUBLICATIONS

Huawei, HiSilicon, Coexistence and channel access for NR unlicensed band operations, 3GPP TSG RAN WG1 Meeting #95, R1-1812194, Spokane, US, Nov. 12-Nov. 16, 2018, 13 pages.

Sharp, Channel access procedure for NR-U, 3GPP TSG RAN WG1 Meeting #98bis, R1-1910929, Chongqing, China, Oct. 14-20, 2019, 5 pages.

Qualcomm Incorporated, Channel access procedures for NR unlicensed, 3GPP Tsg Ran WG1 Meeting #98bis, R1 1911097 Chongqing, CN, October 14th Oct. 20, 2019, 18 pages.

Extended European Search Report for European Application No. 20874454.0 issued Aug. 12, 2022. 7 pages.

Qualcomm Incorporated "DL signals and channels for NR-U" R1-1911095; 3GPP TSG RAN WG1 Meeting #98bis; Chongqing, China; Oct. 14-20, 2019. 17 pages.

First Office Action of the CN application No. 202210602293.5 issued on Jul. 1, 2023. 11 pages with English translation.

* cited by examiner

METHOD OF LBT TYPE DETERMINATION AND USER EQUIPMENT

CROSS-REFERENCE TO RELATED APPLICATIONS

The preset application is a continuation application of International PCT Application No. PCT/CN2020/120455, filed on Oct. 12, 2020, which claims the priority to International PCT Application No. PCT/IB2019/001186, filed on Oct. 11, 2019. The above-identified applications are incorporated herein by reference in their entirety.

TECHNICAL FIELD

The present disclosure relates to communication technology, and in particular to Listen-Before-Talk (LBT) type determination.

BACKGROUND

The statements in this section merely provide information related to the present disclosure and may not constitute prior art. Further, the content in this section may be used to define a concept related to the invention.

In communication technology, a device may follow a channel access procedure of "Listen Before Talk (LBT)". That is, the device needs to perform channel sensing before transmitting a signal on the channel Only when the LBT outcome shows that the channel is idle, the device can perform a signal transmission; otherwise, the device cannot perform signal transmission.

SUMMARY

A method, a User Equipment, a computer program and a computer readable medium for LBT determination are provided.

BRIEF DESCRIPTION OF THE DRAWINGS

The drawings are used merely for illustration purposes but not for limiting the invention.

DETAILED DESCRIPTION

Figure 1:
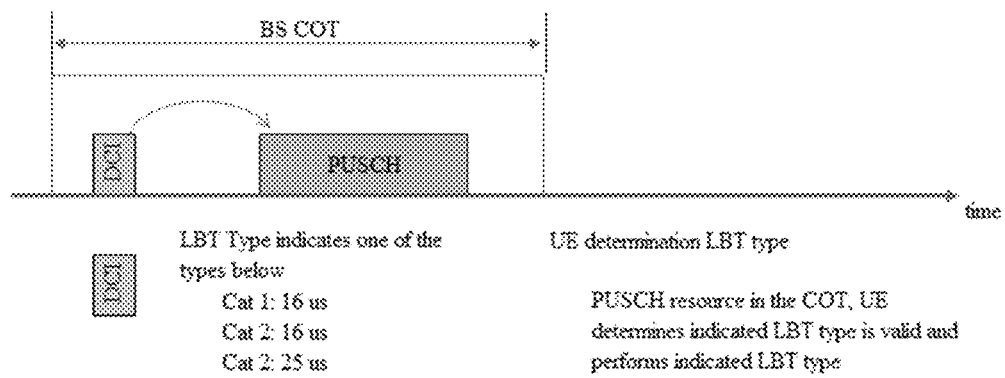
FIG. 1 shows a first example.

The communication technology may be for example a 5G (fifth generation) network using the 5G New Radio (NR) as radio access technology (RAT) defined by 3GPP.

In 5G network, the frequency band used may be licensed band or unlicensed band.

Unlicensed band, or called as unlicensed spectrum, is a shared spectrum. Communication devices in different communication systems can use the unlicensed spectrum as long as they meet the regulatory requirements set by the country or region on the unlicensed spectrum, and do not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, a communication device shall follow the principle of "Listen Before Talk (LBT)". That is, the device needs to perform channel sensing before transmitting a signal on the channel. Only when the LBT outcome shows that the channel is idle, the device can perform signal transmission; otherwise, the device cannot perform signal transmission.

In order to ensure fairness, once a device successfully occupies a channel, the transmission duration cannot exceed a Maximum Channel Occupancy Time (MCOT). On a carrier in an unlicensed band/spectrum, for a channel occupation time (COT) obtained by a base station (BS) after a successful LBT, the BS may share the BS COT to a user equipment (UE) for transmitting an uplink (UL) signal or an uplink channel. In other words, when a BS shares its own BS COT with a UE, the UE can use an LBT type (or called as a LBT mode) for the shared BS COT with a higher priority than the LBT type that is used by the UE to obtain the channel by the UE itself, thereby obtaining the channel with a greater probability.

In 5G NR in the unlicensed band (5G NR-U), a downlink (DL) COT initiated by a base station (gNB) can be shared with a UE for an uplink transmission. In this way, the UE can perform a quick LBT type, e.g., LBT Category 1 (immediate transmission without LBT) if the BS creates a 16 us gap; or Category 2 (one short LBT) if the base station creates a 16 or 25 us gap. If the downlink COT cannot be shared, the UE will perform Category 4 LBT, i.e., the LBT type that is used by the UE to obtain the channel by the UE itself before the UE sends the uplink transmission. The downlink COT here is also called as BS COT.

LBT Category 1 may also be called as Cat1-16 or as Type 2C UL channel access procedure, LBT Category 2 with a 16 µs gap may also be called as Cat2-16 or as Type 2B UL channel access procedure, LBT Category 2 with a 25 µs gap may also be called as Cat2-25 or as Type 2A UL channel access procedure, and LBT Category 4 may also be called as Cat4 or as Type 1 UL channel access procedure.

When a UE is scheduled by the BS to transmit a Physical Uplink Shared CHannel (PUSCH), if the scheduled PUSCH is inside the BS COT, the UE can share the BS COT to perform a quick LBT type; and if the scheduled PUSCH is not inside the BS COT, the UE cannot share the BS COT to perform a quick LBT type. If the BS regains the channel and has a new COT, and the UE may share this new COT to transmit the scheduled PUSCH.

A BS may send an UL grant Downlink Control Indication (DCI) to schedule a PUSCH for a UE. In the DCI, BS may indicate one LBT type, e.g. either Cat1-16, or Cat2-16, or Cat2-25. The UE receives the DCI and may determine the validity of the indicated LBT type by verifying the condition whether a scheduled PUSCH resource or resources are fully inside the BS COT. The COT information may be determined by the UE via another explicit indication, e.g., a group-common DCI (SFI) or via an implicit indication, e.g., a detection of pre-defined signal/channel.

Example 1

In this example, as shown in FIG. 1, a UE receives an UL grant DCI indicating one LBT type, e.g., Cat1-16, Cat2-16, or Cat2-25. When the scheduled PUSCH resource or resources are fully inside the BS COT, the UE may perform the indicated LBT type (e.g., Cat1-16 or Cat2-16 or Cat2-25) before transmitting PUSCH. The indicated LBT Type can be called as a first LBT Type.

Example 2

Figure 2:
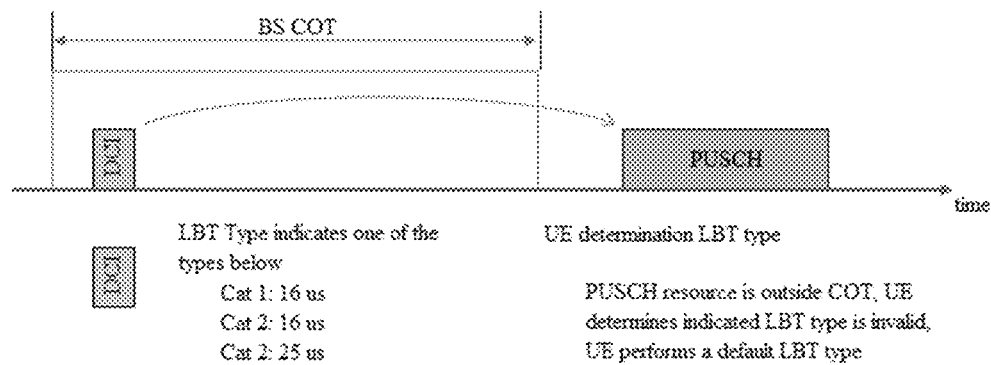
FIG. 2 shows a second example.

As shown in FIG. 2, in this example, a UE receives an UL grant DCI indicating one LBT type, e.g., Cat1-16, Cat2-16, or Cat2-25. When the scheduled PUSCH resource or resources are fully outside the BS COT, the UE may determine that the indicated LBT type from the DCI is not valid and the UE performs a second LBT Type before transmitting the PUSCH. The second LBT type can be a default LBT type, that is, the second LBT type can be LBT Cat4 that is used by the UE to obtain the channel by the UE itself.

Example 3

Figure 3:
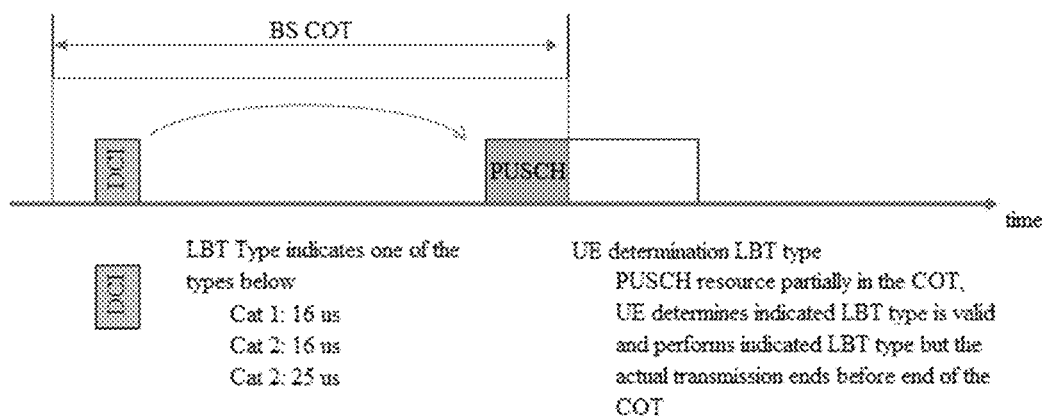
FIG. 3 shows a third example.

As shown in FIG. 3, in this example, a UE receives an UL grant DCI indicating one LBT type, e.g., Cat1-16, Cat2-16, or Cat2-25. When the scheduled PUSCH resource or resources are partially inside BS COT, the UE may perform indicated LBT type, e.g., Cat1-16 or Cat2-16 or Cat2-25, before transmitting PUSCH. But once the LBT passes, the UE can transmit the PUSCH only up to the end of the BS COT.

Example 4

Figure 4:
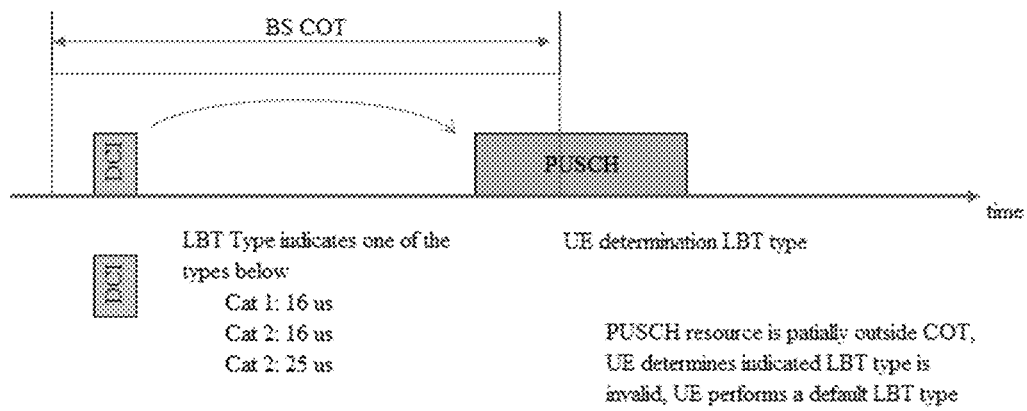
FIG. 4 shows a fourth example.

As shown in FIG. 4, in this example, a UE receives a UL grant DCI indicating one LBT type, e.g., Cat1-16, Cat2-16, or Cat2-25. When the scheduled PUSCH resource or resources are not fully inside BS COT, the UE may determine that the indicated LBT type from the DCI is not valid and the UE may perform the second LBT type before transmitting PUSCH. The second LBT type can be a default LBT type, that is, the second LBT type can be LBT Cat4 that is used by the UE to obtain the channel by the UE itself.

Example 5

Figure 5:
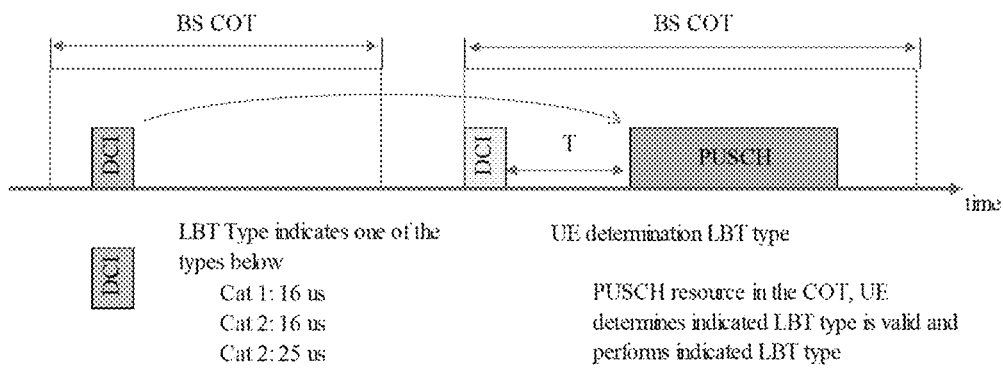
FIG. 5 shows a fifth example.

As shown in FIG. 5, in this example, a UE receives an UL grant DCI indicating one LBT type, e.g., Cat1-16, Cat2-16, or Cat2-25. When the scheduled PUSCH resource or resources are fully outside the BS COT in which UE receives the UL grant, the UE may determine that the indicated LBT type from DCI is not valid and the UE may perform a second LBT type before transmitting PUSCH. The second LBT type can be a default LBT type, that is, the second LBT type can be LBT Cat4 that is used by the UE to obtain the channel by the UE itself. However, before the starting of the PUSCH transmission time, the UE may receive another DCI, e.g., another group-common DCI, which may be in DCI format 2_0, (indicating that a new BS COT starts and the new BS COT covers the whole PUSCH resource or resources. Then, the UE may switch to the indicated LBT type to perform LBT.

This LBT type switching can be confirmed by the time interval (T) between the end of the reception of the another DCI, which updates the COT information, and the starting symbol of the scheduled PUSCH. If T is smaller than a pre-defined interval, the UE will not do the LBT type switching and continue performs the second LBT type before transmitting the PUSCH. If T is greater than or equal to a pre-defined interval, the UE may perform the LBT type switching and perform the indicated LBT type before transmitting the PUSCH.

The above schemes can be applied to other mobile networks, in particular to mobile network of any further generation cellular network technology, e.g., 6G, etc.

Clauses

1. A method, performed by a user equipment (UE), for determining a Listen Before Talk (LBT) type for a Physical Uplink Shared CHannel (PUSCH) transmission, which is scheduled by an uplink (UL) grant Downlink Control Information (DCI), the method comprising:
   obtaining a first indication about the LBT type;
   obtaining a second indication about a starting location $T\_cot\_s\_1$ of a first Base Station Channel Occupancy Time (BS COT) and an ending location $T\_cot\_e\_1$ of the first BS COT;
   obtaining a third indication about a starting location $T\_pusch\_s$ of a scheduled PUSCH resource and an ending location $T\_pusch\_e$ of the scheduled PUSCH resource;
   determining the LBT type for the PUSCH transmission, based on the first, second and third indications, comprising:
   when the scheduled PUSCH resource is fully inside the first BS COT: $T\_cot\_s\_1 \leq T\_pusch\_s$ and $T\_cot\_e\_1 \geq T\_pusch\_e$, the LBT type for the PUSCH transmission is the LBT type indicated by the first indication.

2. The method of clause 1, wherein
   when the scheduled PUSCH resource is not fully inside the first BS COT, the LBT type for the PUSCH transmission is a second LBT type.

3. The method of clause 2, wherein the step of when the scheduled PUSCH resource is not fully inside the first BS COT, the LBT type for the PUSCH transmission is the second LBT type comprises:
   when the scheduled PUSCH resource is fully outside the first BS COT: $T\_cot\_e\_1 \leq T\_pusch\_s$, the LBT type for the PUSCH transmission is the second LBT type;
   when the scheduled PUSCH resource is partially outside the first BS COT: $T\_cot\_s\_1 \leq T\_pusch\_s$, and $T\_cot\_e\_1 < T\_pusch\_e$, the LBT type for the PUSCH transmission is the second LBT type.

4. The method of clause 2 or 3, wherein the LBT type for the PUSCH transmission is updated based on a starting location $T\_cot\_s\_2$ of a second BS COT and an ending location $T\_cot\_e\_2$ of the second BS COT, which are indicated by a forth indication, comprising:
   when the scheduled PUSCH resource is fully inside the second BS COT: $T\_cot\_s\_2 \leq T\_pusch\_s$, and $T\_cot\_e\_2 \geq T\_pusch\_e$, the LBT type for the PUSCH transmission is changed to the LBT type indicated by the first indication.

5. The method of clause 4, wherein
   when the scheduled PUSCH resource is not fully inside the second BS COT, the LBT type for the PUSCH transmission is not changed.

6. The method of clause 5, wherein the step of when the scheduled PUSCH resource is not fully inside the second BS COT, the LBT type for the PUSCH transmission is not changed comprises:
   when the scheduled PUSCH resource is fully outside the second BS COT: $T\_cot\_e\_2 \leq T\_pusch\_s$, the LBT type for the PUSCH transmission is not changed;
   when the scheduled PUSCH resource is partially outside the second BS COT: $T\_cot\_s\_2 \leq T\_pusch\_s$, and $T\_cot\_e\_2 < T\_pusch\_e$, the LBT type for the PUSCH transmission is not changed.

7. The method of any one of clause 4 to 6, further comprising:
   when updating the LBT type for the PUSCH transmission, checking the condition that the time interval between the end of the reception of the forth indication and the starting location T_pusch_s of the scheduled PUSCH resource should be greater than or equal to a pre-defined interval, wherein the pre-defined interval is pre-stored or RRC configured.

8. The method of any one of the preceding clauses, wherein the first BS COT is the COT where the UE receives the UL grant DCI that schedules the PUSCH transmission.

9. The method of any one of clauses 4 to 8, wherein the second BS COT is a COT which starts after the ending location T_cot_e_1 of the first BS COT and before the starting location of the scheduled PUSCH resource: T_cot_e_1≤T_cot_s_2≤T_pusch_s.

10. The method of any one of the preceding clauses, wherein the first indication and the third indication are given in the UL grant DCI that schedules the PUSCH transmission.

11. The method of any one of clauses 4 to 10, wherein the second indication is either explicitly given in a first group-common DCI or implicitly derived by the UE via a pre-defined signal/channel.

12. The method of any one of clauses 4 to 10, wherein the forth indication is either explicitly given in a second group-common DCI or implicitly derived by the UE via a pre-defined signal/channel.

13. The method of clause 11 or 12, wherein the first and second group-common DCIs are in DCI format 2_0.

14. The method of any one of the preceding clauses, wherein the LBT type indicated by the first indication is chosen among one the followings: Type 2A UL channel access procedure, or Type 2B UL channel access procedure, or Type 2C UL channel access procedure.

15. The method of any one of clauses 2 to 14, wherein the second LBT type is Type 1 UL channel access procedure.

16. The method of any one of preceding clauses, wherein the BS is a base station of a fifth generation (5G) mobile network using 5G New Radio (5G NR) as radio access technology (RAT).

17. The method of clause 16, being applied to 5G NR in unlicensed spectrum (5G NR-U).

18. A user equipment (UE), being adapted to execute the method of any one of clauses 1 to 17.

19. The user equipment (UE) of clause 18, comprising one or more processors configured to control the execution of the method of any one of clauses 1 to 17.

20. A computer program, comprising instructions, when executed by a user equipment, for causing the user equipment to perform the steps of the method according to any one of clauses 1 to 17.

21. A computer readable medium, comprising instructions for causing a user equipment to perform the steps of the method according to any one of clauses 1 to 17.

It should be understood that the invention is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

The invention claimed is:

1. A method, performed by a user equipment (UE), for determining a Listen Before Talk (LBT) type for a Physical Uplink Shared CHannel (PUSCH) transmission, which is scheduled by an uplink (UL) grant Downlink Control Information (DCI), the method comprising:

obtaining a first indication about the LBT type;
obtaining a second indication about a starting location T_cot_s_1 of a first Base Station Channel Occupancy Time (BS COT) and an ending location T_cot_e_1 of the first BS COT;
obtaining a third indication about a starting location T_pusch_s of a scheduled PUSCH resource and an ending location T_pusch_e of the scheduled PUSCH resource; and
determining the LBT type for the PUSCH transmission, based on the first, second and third indications, comprising:
when the scheduled PUSCH resource is fully inside the first BS COT: T_cot_s_1≤T_pusch_s and T_cot_e_1≥T_pusch_e, the first BS COT is used for sharing for the UE to perform a quick LBT type, wherein the LBT type for the PUSCH transmission is the LBT type indicated by the first indication;
when the scheduled PUSCH resource is not fully inside the first BS COT, the first BS COT is not used for sharing for the UE to perform the quick LBT type; wherein the LBT type for the PUSCH transmission is a second LBT type;
wherein the step of when the scheduled PUSCH resource is not fully inside the first BS COT, the LBT type for the PUSCH transmission is the second LBT type comprises:
when the scheduled PUSCH resource is fully outside the first BS COT: T_cot_e_1≤T_pusch_s, the LBT type for the PUSCH transmission is the second LBT type;
when the scheduled PUSCH resource is partially outside the first BS COT: T_cot_s_1≤T_pusch_s, and T_cot_e_1<T_pusch_e, the LBT type for the PUSCH transmission is the second LBT type.

2. The method of claim 1, wherein the LBT type for the PUSCH transmission is updated based on a starting location T_cot_s_2 of a second BS COT and an ending location T_cot_e_2 of the second BS COT, which are indicated by a fourth indication, comprising:
when the scheduled PUSCH resource is fully inside the second BS COT: T_cot_s_2≤T_pusch_s, and T_cot_e_2≥T_pusch_e, the LBT type for the PUSCH transmission is changed to the LBT type indicated by the first indication.

3. The method of claim 2, further comprising:
when updating the LBT type for the PUSCH transmission, checking the condition that the time interval between the end of the reception of the fourth indication and the starting location T_pusch_s of the scheduled PUSCH resource should be greater than or equal to a pre-defined interval, wherein the pre-defined interval is pre-stored or RRC configured.

4. The method of claim 2, wherein the second BS COT is a COT which starts after the ending location T_cot_e_1 of the first BS COT and before the starting location of the scheduled PUSCH resource: T_cot_e_1≤T_cot_s_2≤T_pusch_s.

5. The method of claim 2, wherein the second indication is either explicitly given in a first group-common DCI or implicitly derived by the UE via a pre-defined signal/channel.

6. The method of claim 1, wherein the first indication and the third indication are given in the UL grant DCI that schedules the PUSCH transmission.

7. The method of claim 1, wherein the LBT type indicated by the first indication is chosen among one the followings:

Type 2A UL channel access procedure, or Type 2B UL channel access procedure, or Type 2C UL channel access procedure.

8. The method of claim 1, wherein the second LBT type is Type 1 UL channel access procedure.

9. A user equipment (UE), for determining a Listen Before Talk (LBT) type for a Physical Uplink Shared CHannel (PUSCH) transmission, which is scheduled by an uplink (UL) grant Downlink Control Information (DCI), the UE comprising:
- a receiver, configured to obtain a first indication about the LBT type and a third indication about a starting location T_pusch_s of a scheduled PUSCH resource and an ending location T_pusch_e of the scheduled PUSCH resource; and
- a processor, configured to obtain a second indication about a starting location T_cot_s_1 of a first Base Station Channel Occupancy Time (BS COT) and an ending location T_cot_e_1 of the first BS COT; and determine the LBT type for the PUSCH transmission, based on the first, second and third indications; wherein
when the scheduled PUSCH resource is fully inside the first BS COT: T_cot_s_1≤T_pusch_s and T_cot_e_1≥T_pusch_e, the first BS COT is used for sharing for the UE to perform a quick LBT type, wherein the LBT type for the PUSCH transmission is the LBT type indicated by the first indication;
when the scheduled PUSCH resource is not fully inside the first BS COT, the first BS COT is not used for sharing for the UE to perform the quick LBT type, wherein the LBT type for the PUSCH transmission is a second LBT type, wherein:
when the scheduled PUSCH resource is fully outside the first BS COT: T_cot_e_1≤T_pusch_s, the LBT type for the PUSCH transmission is the second LBT type;
when the scheduled PUSCH resource is partially outside the first BS COT: T_cot_s_1≤T_pusch_s, and T_cot_e_1<T_pusch_e, the LBT type for the PUSCH transmission is the second LBT type.

10. The UE of claim 9, wherein the processor is further configured to update the LBT type for the PUSCH transmission based on a starting location T_cot_s_2 of a second BS COT and an ending location T_cot_e_2 of the second BS COT, which are indicated by a fourth indication, comprising:
- the processor is further configured to, when the scheduled PUSCH resource is fully inside the second BS COT: T_cot_s_2≤T_pusch_s, and T_cot_e_2≥T_pusch_e, change the LBT type for the PUSCH transmission to the LBT type indicated by the first indication.

11. The UE of claim 10, wherein the second indication is either explicitly given in a first group-common DCI or implicitly derived by the UE via a pre-defined signal/channel.

12. The UE of claim 9, wherein the first indication and the third indication are given in the UL grant DCI that schedules the PUSCH transmission.

13. The UE of claim 9, wherein the LBT type indicated by the first indication is chosen among one the followings: Type 2A UL channel access procedure, or Type 2B UL channel access procedure, or Type 2C UL channel access procedure.

* * * * *